April 3, 1973    R. D. HORNER    3,725,086

METHOD OF PACKAGING CONSUMABLE LIQUIDS

Filed Sept. 24, 1970

INVENTOR

ROBERT D. HORNER

BY

SOKOLSKI & WOHLGEMUTH

ATTORNEYS

United States Patent Office 3,725,086
Patented Apr. 3, 1973

3,725,086
METHOD OF PACKAGING CONSUMABLE LIQUIDS
Robert D. Horner, Upland, Calif., assignor to Tahitian Products Co., Inc.
Filed Sept. 24, 1970, Ser. No. 74,960
Int. Cl. B65b *31/00, 1/04*
U.S. Cl. 99—189
4 Claims

ABSTRACT OF THE DISCLOSURE

In a method of packing consumable liquid food matter within sealable, pliable packets wherein the liquid is injected into a preformed packet prior to sealing the packet, the improvement which comprises, concurrently injecting and mixing with the liquid an inert gas such as nitrogen during the filling of the pliable packet.

---

The packaging of various liquid food products in pliable packets has become increasingly popular. A typical such packet is comprised of a metal foil having a polymer film at least on the inner sides thereof and usually on the outer sides thereby forming a laminate. The materials are generally sealable under heat and pressure when applied thereto such that the polymer film will form a tight seal on the edges of the packet. Generally several packets are formed and filled at a time. According to one method this is accomplished in a relatively large machine wherein two continuous rolls of the pliable material comprising the packet are utilized with each roll feeding one side of the packet into a forming part of the machine. A plurality of feeder tubes for the liquid material are placed such that the two sheets are brought together on either side of the tubes. Initially pressure and heat is applied to form the side walls of a plurality of packets around each feeder tube, such that in effect each feeder tube is surrounded by a long continuous single packet. Thus, for example, 6, 8, or 10 packets can be formed simultaneously in a given machine. Just below the end of the feeder tubes there is placed means for sealing the packets at the bottom thereof. Shortly after the bottoms are sealed the cycle of the machine is such that the liquid is then injected into the given packet. After the injection period which occurs simultaneously with the packet moving through the machine the top of the packet is sealed just below the edge of the tube to be simultaneous with the sealing of the bottom of the next packet in a continuous line. The herein invention pertains particularly to this method of packaging a liquid consumable matter.

It has been recognized in the past that an excess of air or oxygen in the sealed tube is undesirable since it can deleteriously effect the storage of the food product as well as affect the flavor of the food matter. Because of this, others have concurrently injected nitrogen into the packet. The nitrogen has normally been injected concurrent with the liquid in a separate tube serving to displace the oxygen in the tube above the liquid matter. In other words the nitrogen was injected downwardly into the packet concurrent with filling of the packet with liquid food matter in a separate stream. In fact nitrogen can be utilized in other types of containers by passing over the top of the container or the like to once again displace the oxygen containing gas or other head space gases therein.

Heretofore there has been no recognition of the problem of entrapped oxygen within the liquid itself. The sole effort in the past as indicated has been directed to replacing the head space gases in the food packet with an inert gas such as nitrogen. For some food matter, this is sufficient since the remaining entrapped oxygen will not seriously affect the taste or storability of the product. However, for liquid food matter such as citrus juices it has been discovered as part of the herein invention that the entrapped oxygen within the liquid can seriously affect its long term storage within the packet affecting its flavor, consistency and the like. In the processing of liquids such as citrus juices there is significant exposure of the liquid to oxygen or air such that a significant amount of the oxygen can become entrapped within the liquid. The prior art methods merely as indicated to replace the oxygen or air above the liquid within the tube being filled.

Thus it is an object of this invention to provide a method for removing entrapped air oxygen form liquids during the processing thereof and filling of food packets containing same.

The above and other objects of this invention are accomplished by the herein method which comprises injecting a nitrogen gas stream into the liquid concurrent with the liquid being injected into a tube during the filling operation. Thus, rather than the nitrogen entering the tube directly as in prior art methods, the nitrogen is directed so as to inetrsect and mix with the liquid being injected prior to the liquid striking the packet. This causes a displacement of the air or oxygen within the liquid. It is believed that the invention can be further understood from the following detailed description and drawing.

Figure 1:
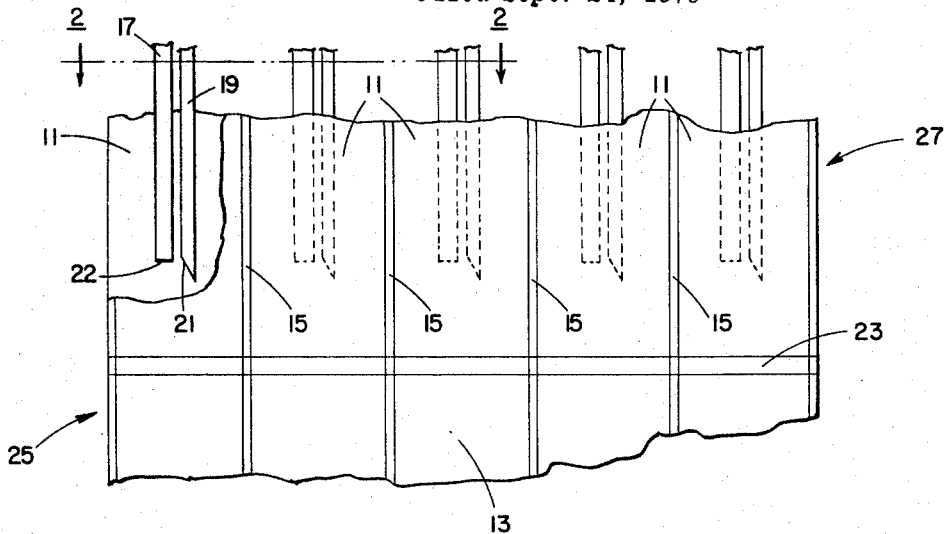
FIG. 1 is a plan view of plurality of filling tubes and packets within a machine for the concurrent filling thereof utilizing the principal of this invention.
Figure 2:
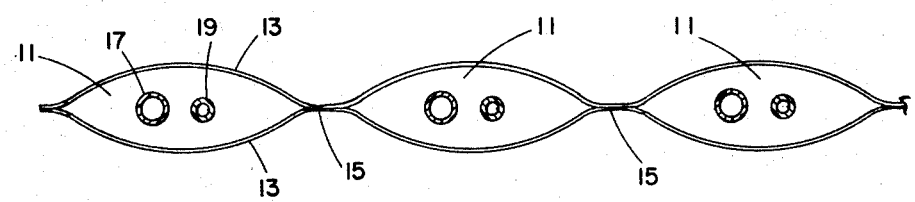
FIG. 2 is a top view taken along lines 2—2 of FIG. 1.

Turning now to FIGS. 1 and 2, there is seen an arrangement of plurality of packets 11 being concurrently filled with liquid food matter. The packets 11 are comprised of two parallel sheets 13 which have been sealed to each other along parallel lines 15 which will serve as the sides of the form packet. The sheets 13 are fed from rollers and brought by each side of a liquid fill tube 17 and nitrogen gas tube 19, then they are sealed along the edges 15. The food matter such as the citrus juices and the like is injected at a pulse into the moving packet 11 as it passes along through the machine. The pulse is regulated so that it will occur in such a manner that the fill liquid will never touch the end 21 of the nitrogen tube 19 or end 22 of the fill tube 17 since a seal cannot be had at the top of the packet if liquid interferes therewith. Thus it is important the end 21 of the fill tube be kept dry. A typical pulse will last 2 to 3 seconds for a one and one half ounce fill. After the packet has been filled and is continually fed through the machine, means is provided, not shown, for sealing the packets along the line 23 normal to the edges 15. The seal 23 serves both to seal the top of one row of packets 25 while sealing the bottom of the upper row 27. This process is conventional in the art and thus not believed warranted to give a lengthy description thereof. Various machines are available and known in the art for accomplishing the foregoing purpose.

As seen in FIG. 1, in the herein invention the end 21 of the nitrogen gas tube adjacent the fill tube 17 is biased in a manner so as to direct the outcoming nitrogen gas at an angle into the liquid leaving the end 22 of the fill tube 17. In prior art devices the tube 19 when utilized had a flat end and directed the nitrogen or other inert gas directly downward into the package concurrent with the liquid being admitted. By blowing the nitrogen gas into the liquid the air or oxygen therein is effectively displaced with the nitrogen thus the liquid from tube 17 and the nitrogen or other inert gas from tube 19 will be injected simultaneously in the same pulse period so as to achieve the mixing of the nitrogen gas with the liquid prior to liquid forming into the packet.

It has been found that nitrogen flow rate into a packet containing one and one half ounces of fluid at a flow rate of one hundred cubic foot per minute of the nitrogen will suffice to accomplish the herein results. It is relatively simple trial and error to determine the proper nitrogen flow rate for a given liquid flow rate in order to achieve the foregoing results. This is done by removing the head space gas from a formed packet and determining the gas composition therein. Thus it can be seen that in the present invention not only does the nitrogen replace any entrained oxygen or air within the liquid food product but further will of course serve to remove any of the oxygen from the head space area above the liquid from within the packet. It is to be pointed out that the problem of entrained oxygen is particularly serious in citrus juices which appear to be unusually sensitive to oxygen deterioration such that the flavor will be readily degraded.

Figure 3:
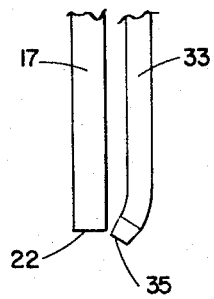
FIG. 3 is a pictorial presentation of the second embodiment of this invention.

Turning now to FIG. 3 there is seen a second embodiment of this invention wherein the same liquid fill tube 17 is shown, however, a different nitrogen or gas tube 33 is utilized wherein the end 35 is slightly curved or bent so as to direct the gas into the liquid stream leaving the end 22 of the fill tube 17. Obviously, other means can be utilized for achieving the results which essentially is directed to means for effectively directing the inert gas utilized into the liquid fill stream prior to the stream striking the packet.

Though it might appear obvious to inject the nitrogen below the surface of the liquid within the packet to effectively bubble it therethrough such is not feasible since it is undesirable as previously mentioned to have any liquid on the tubes which could be in turn transmitted to the top of the packet and prevent an effective seal. Thus the herein arrangements are particularly shown which will effect the mixing of the gas without wetting the end of the tubes. In fact, along this same line, it is to be pointed out that the nitrogen gas should be directed to intersect the liquid without causing it to splash around or about the fill tube 17 thus it is preferable that the nitrogen gas intersect the liquid at a position somewhat downstream from the end of the fill tube.

I claim:
1. A method for packaging consumable liquid in a pliable sealed packet comprising the steps of:
   injecting a pulsed stream of liquid into the packet from a first tube, and
   injecting a stream of inert gas from a second tube into the liquid stream immediately as it leaves the first tube so as to replace any air or oxygen entrained therein, the outlet of the second tube being angulated with respect to the outlet of the first tube so as to direct the gas into the liquid at a slant angle relative to the direction of the liquid stream.
2. The method of claim 1 wherein the gas is nitrogen.
3. The method of claim 1 comprising:
   injecting a sufficient amount of inert gas into the liquid to replace any entrained oxygen or air therein.
4. The method of claim 1 wherein the consumable liquid contains citrus juice.

References Cited
UNITED STATES PATENTS

| | | | |
|---|---|---|---|
| 1,270,698 | 6/1918 | Coffman | 99—189 |
| 2,047,935 | 1/1932 | Beal et al. | 99—155 |
| 2,318,178 | 5/1943 | McKinnis | 99—189 X |
| 2,433,071 | 12/1947 | Stevenson | 99—189 X |
| 3,063,845 | 11/1962 | Graves | 99—189 X |
| 3,113,871 | 12/1963 | Webster | 99—155 |

NORMAN YUDKOFF, Primary Examiner

K. P. VAN WYCK, Assistant Examiner

U.S. Cl. X.R.

55—53; 141—9, 10, 11, 100